(12) United States Patent
Grutta et al.

(10) Patent No.: US 11,725,998 B2
(45) Date of Patent: Aug. 15, 2023

(54) METHOD AND CORRESPONDING CIRCUIT FOR DETECTING AN OPENING OR CLOSING EVENT

(71) Applicant: STMicroelectronics S.r.l., Agrate Brianza (IT)

(72) Inventors: Saverio Grutta, Adrano (IT); Enrico Rosario Alessi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1119 days.

(21) Appl. No.: 16/277,415

(22) Filed: Feb. 15, 2019

(65) Prior Publication Data

US 2019/0265121 A1 Aug. 29, 2019

(30) Foreign Application Priority Data

Feb. 23, 2018 (IT) .................. 102018000003003

(51) Int. Cl.
| | |
|---|---|
| *G01L 23/32* | (2006.01) |
| *G08B 13/08* | (2006.01) |
| *G08B 13/20* | (2006.01) |
| *H04M 1/72454* | (2021.01) |
| *G08B 29/18* | (2006.01) |
| *G08B 13/16* | (2006.01) |
| *H04M 1/72421* | (2021.01) |

(52) U.S. Cl.
CPC .............. *G01L 23/32* (2013.01); *G08B 13/08* (2013.01); *H04M 1/72454* (2021.01); *G08B 13/1672* (2013.01); *G08B 13/20* (2013.01); *G08B 29/183* (2013.01); *G08B 29/188* (2013.01); *H04M 1/72421* (2021.01)

(58) Field of Classification Search
None
See application file for complete search history.

(56) References Cited

U.S. PATENT DOCUMENTS

| | | | |
|---|---|---|---|
| 4,804,945 A | 2/1989 | Millet | |
| 9,410,346 B2 | 8/2016 | Wang et al. | |
| 2008/0219100 A1* | 9/2008 | Fisher | F41H 13/00 367/129 |

(Continued)

FOREIGN PATENT DOCUMENTS

| | | |
|---|---|---|
| CN | 201460424 U | 5/2010 |
| CN | 203084798 U | 7/2013 |

(Continued)

OTHER PUBLICATIONS

Wu, et al., "Monitoring Building Door Events using Barometer Sensor in Smartphones", UBICOMP '15, Sep. 7-11, 2015, Osaka, Japan, pp. 319-323.

(Continued)

*Primary Examiner* — John F Mortell
(74) *Attorney, Agent, or Firm* — Slater Matsil, LLP

(57) ABSTRACT

A method includes collecting, at a building opening, air pressure signals from a pressure sensor and sound signals from a sound sensor. The method also includes sensing pressure peaks occurring in the air pressure signals and sensing sound pulses occurring in the sound signals. A joint occurrence of a pressure peak in the air pressure signals and a sound pulse in the sound signals is indicative of an opening/closing event of the building opening.

20 Claims, 4 Drawing Sheets

(56) References Cited

U.S. PATENT DOCUMENTS

| | | | |
|---|---|---|---|
| 2009/0021112 A1 | 1/2009 | Kondou et al. | |
| 2012/0070153 A1* | 3/2012 | Jonsson | F21V 23/0471 |
| | | | 398/115 |
| 2014/0015640 A1 | 1/2014 | Hourne et al. | |
| 2014/0171068 A1* | 6/2014 | Marti | G01S 1/06 |
| | | | 455/456.3 |
| 2018/0286209 A1* | 10/2018 | Singh | G08B 29/181 |
| 2019/0070907 A1* | 3/2019 | Dudar | F02B 39/10 |
| 2019/0124476 A1* | 4/2019 | Blaha, Jr. | H04W 4/33 |

FOREIGN PATENT DOCUMENTS

| | | |
|---|---|---|
| CN | 107123220 A | 9/2017 |
| EP | 2963628 A1 | 1/2016 |
| WO | 2006112258 A1 | 10/2006 |

OTHER PUBLICATIONS

Patel, Shwetak N. et al. "Detecting Human Movement by Differential Air Pressure Sensing in HVAC System Ductwork: An Exploration in Infrastructure Mediated Sensing," Pervasive Computing: 6th International Conference, Pervasive 2008 Sydney, Australia, May 19-22, 2008 Proceedings 6. Springer Berlin Heidelberg, 2008, 18 pages.

\* cited by examiner

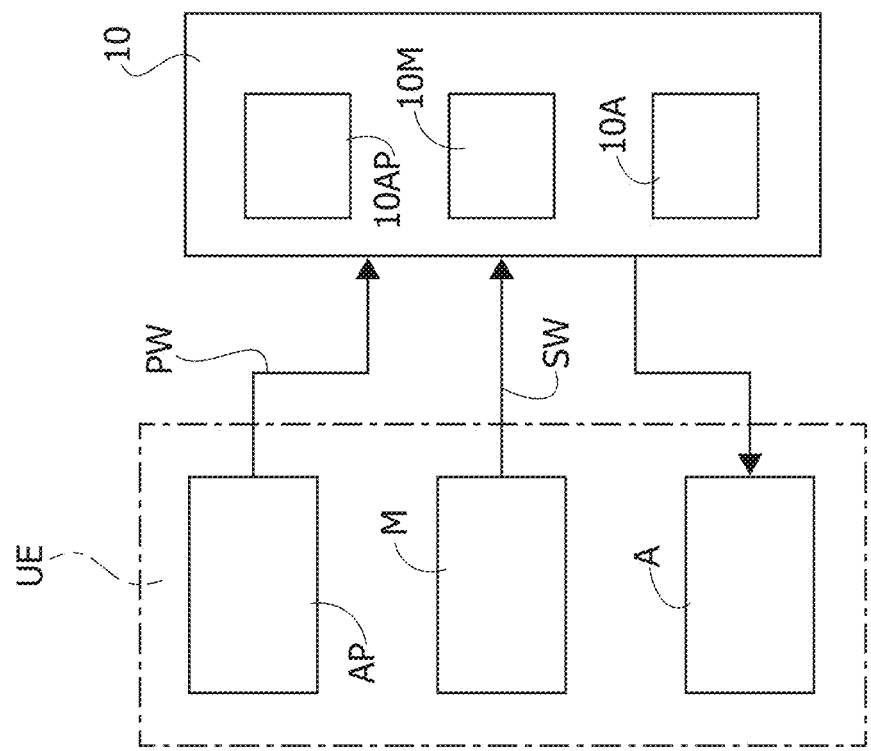
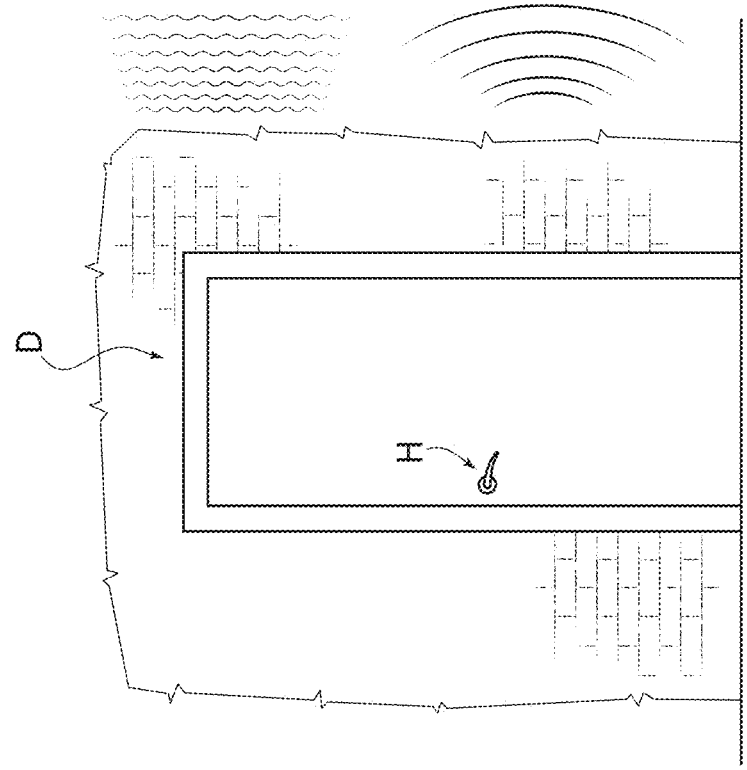
FIG. 1

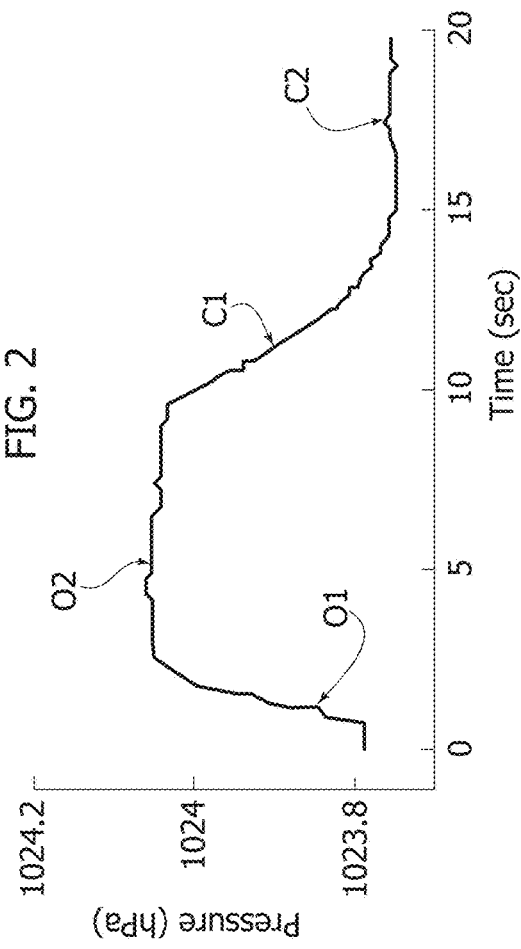
FIG. 2
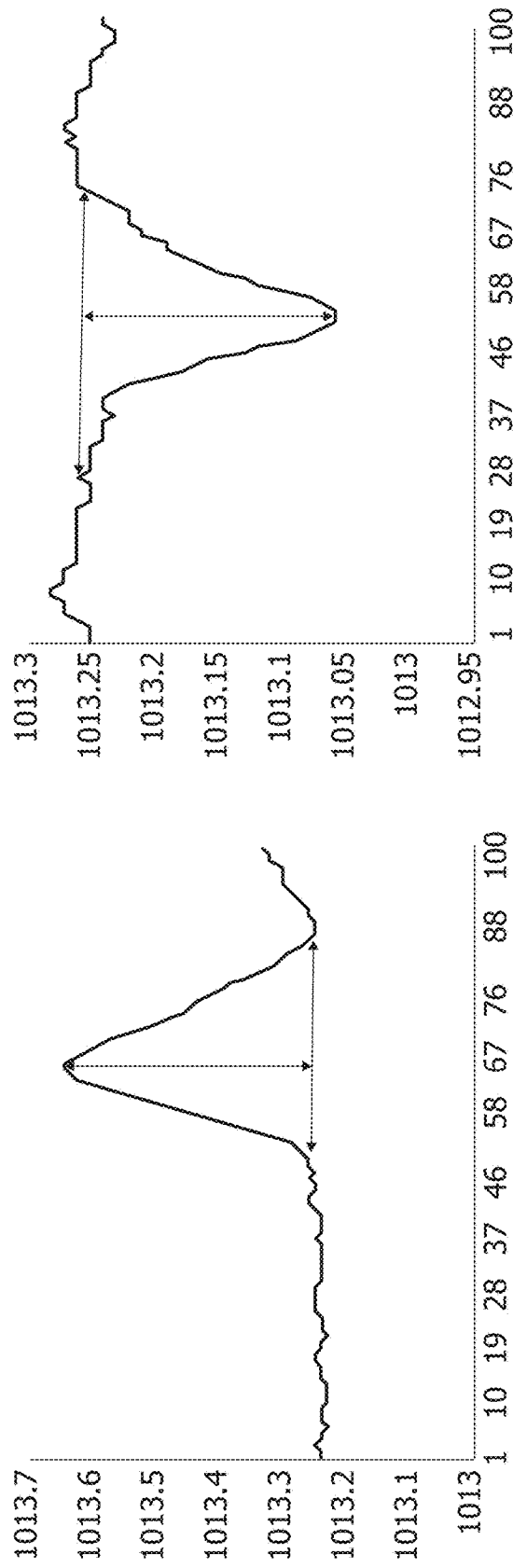
FIG. 3A
FIG. 3B

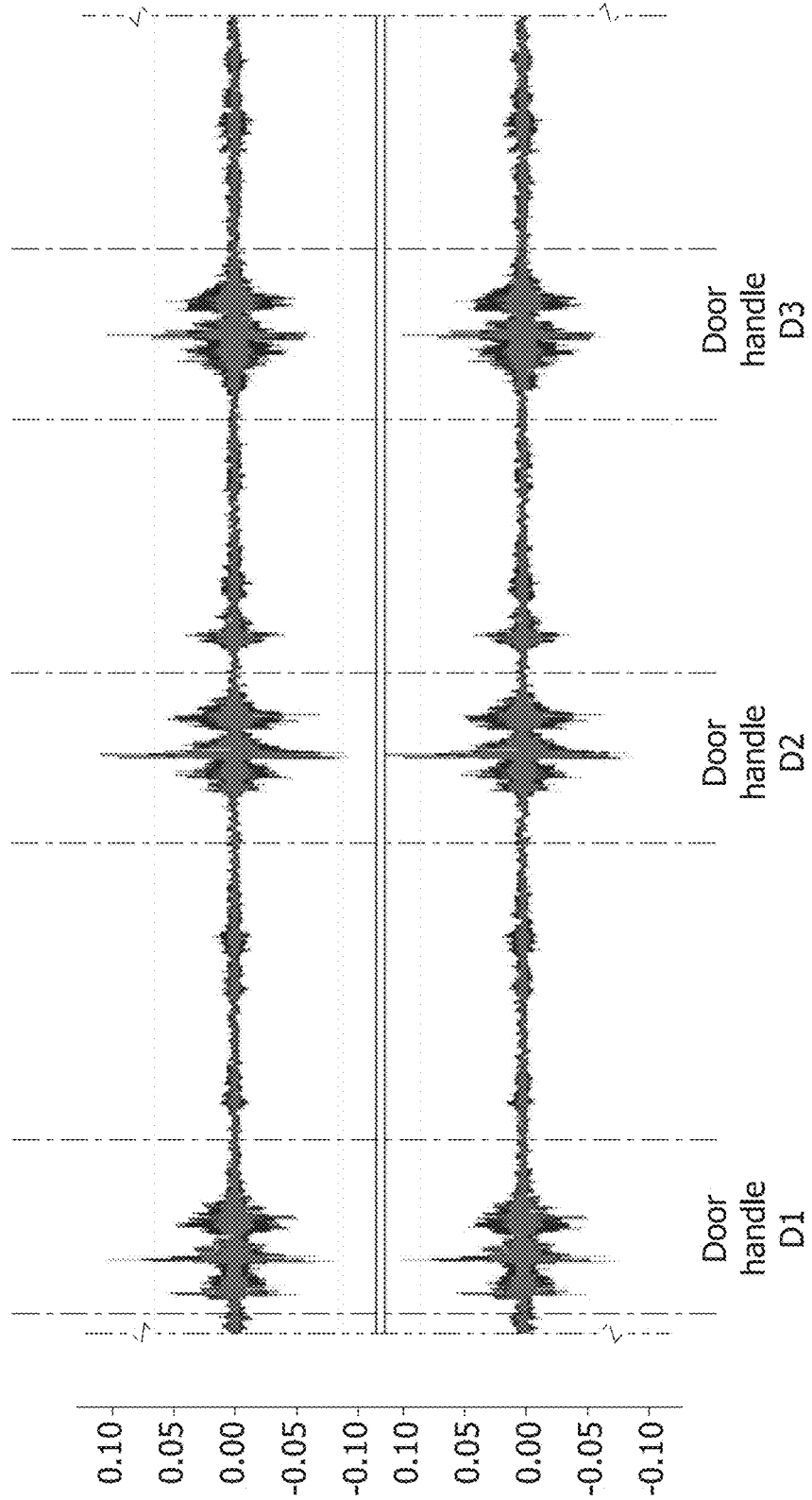

METHOD AND CORRESPONDING CIRCUIT FOR DETECTING AN OPENING OR CLOSING EVENT

CROSS-REFERENCE TO RELATED APPLICATIONS

This application claims priority to Italian Patent Application No. 102018000003003, filed on Feb. 23, 2018, which application is hereby incorporated herein by reference.

TECHNICAL FIELD

The description relates to event detection including a detection method and corresponding circuit.

BACKGROUND

Surveillance systems as currently used involve distributing pre-installed sensors over the surveillance environment, which may turn out to be expensive.

Due to their cost, such systems, mainly intended for use as security systems for buildings, are not suited for simple monitoring applications for homes, cars and vehicles.

Certain "door event" detection systems have been proposed which involve electrical circuitry installed e.g. at the periphery of doors to detect opening/closing events.

Wu, et al. in: "Monitoring Building Door Events using Barometer Sensor in Smartphones", UBICOMP '15, Sep. 7-11, 2015, OSAKA, JAPAN, pp. 319-323 provide certain test results which indicate that barometer sensors as provided in smart phones can be used for detecting opening/closing events of doors in buildings.

This observation is based on the recognition that in buildings equipped with HVAC (heating, ventilating and air conditioning) systems—which maintain a convenient pressure difference between indoor and outdoor environments—a sharp change of indoor pressure occurs when a building door is opened. This change can be detected e.g. using a smart phone pressure sensor.

Once the door is closed, the HVAC system re-establishes a pressure level, which may permit to detect a subsequent opening/closing event.

However, such approach to door event detection with smart phone pressure sensors was found to operate in reliable manner (only) in buildings equipped with HVAC systems which maintain an indoor/outdoor pressure difference.

It is noted that the same detection approach, if attempted in buildings without HVAC systems, is unable to provide reliable results.

SUMMARY

One or more embodiments may apply, for instance, to detecting opening/closing events of building openings (e.g. doors, windows, shutters) which may be indicative of intrusions into homes and other indoor environments, and, more generally, of intrusions into private spaces such as, e.g., vehicle passenger compartments and cabins (e.g., cockpits).

One or more embodiments can contribute in providing improved solutions that may overcome the shortcomings of prior approaches.

One or more embodiments may relate to a corresponding circuit.

One or more embodiments may relate to a corresponding device, such as a user equipment for mobile communications (e.g., a mobile phone of a "smart" type).

One or more embodiments may include a computer program product loadable in the memory of at least one processing circuit (e.g., a computer) and including software code portions for executing the steps of the method when the product is run on at least one processing circuit. As used herein, reference to such a computer program product is understood as being equivalent to reference to a computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may facilitate detecting door events (opening/closing) using mobile devices (e.g., portable and/or wearable devices such as mobile phones).

One or more embodiments are applicable to the field of environmental sensors for mobile devices for use in the consumer market (e.g., automotive sector) and the industrial user market.

One or more embodiments may facilitate monitoring door opening/closing events in buildings by using sensors as provided in state-of-the-art smart phones, thus making any infrastructure integration unnecessary.

One or more embodiments may provide an innovative door event detection module using a pressure sensor and a microphone as provided in a mobile device.

Implementations of one or more embodiments may exhibit low power and low latency, making them ideally suitable for use in various applicative contexts.

An intruder detection module according to embodiments may comprise "macroblocks" such as an air pressure module for air pressure pattern recognition, a sound module for audio pattern recognition and a door event decision module.

One or more embodiments can be based on the recognition that opening and closing events of a door may result in a sharp change of pressure value with a recognizable pattern, which can be detected by pressure sensors as those equipping modern smart phones.

One or more embodiments are based on the recognition that the amplitude of pressure peaks may be proportional to the intensity of the force applied to the door, with the ability of detecting door events being related to various factors such as the volume (space) around the door, the type of door, and/or the rate of the door movement.

In one or more embodiments, air pressure data from a pressure sensor are combined with acoustic wave signals detected, e.g., via a microphone; the microphone may be used to detect impulsive sounds as generated by a door (e.g., handle, lock, leaf hitting frame), e.g., by exploiting an acoustic wave fingerprint.

In one or more embodiments, a pressure sensor can be used to detect a pressure variation due to the opening/closing movement of a door.

In one or more embodiments, a decision on the door event can involve identifying an acoustic door handle pattern and an air pressure pattern.

BRIEF DESCRIPTION OF THE DRAWINGS

One or more embodiments will now be described, by way of example only, with reference to the annexed figures, wherein:

FIG. 1 is diagram of a possible system architecture of embodiments,

FIGS. 2 and 3A-3B are diagrams exemplary of possible time behavior of signals in embodiments, FIG. 4 is a diagram, comprising FIGS. 4A and 4B, respectively exemplary of possible time behavior of signals in embodiments.

DETAILED DESCRIPTION OF ILLUSTRATIVE EMBODIMENTS

Figure 5:
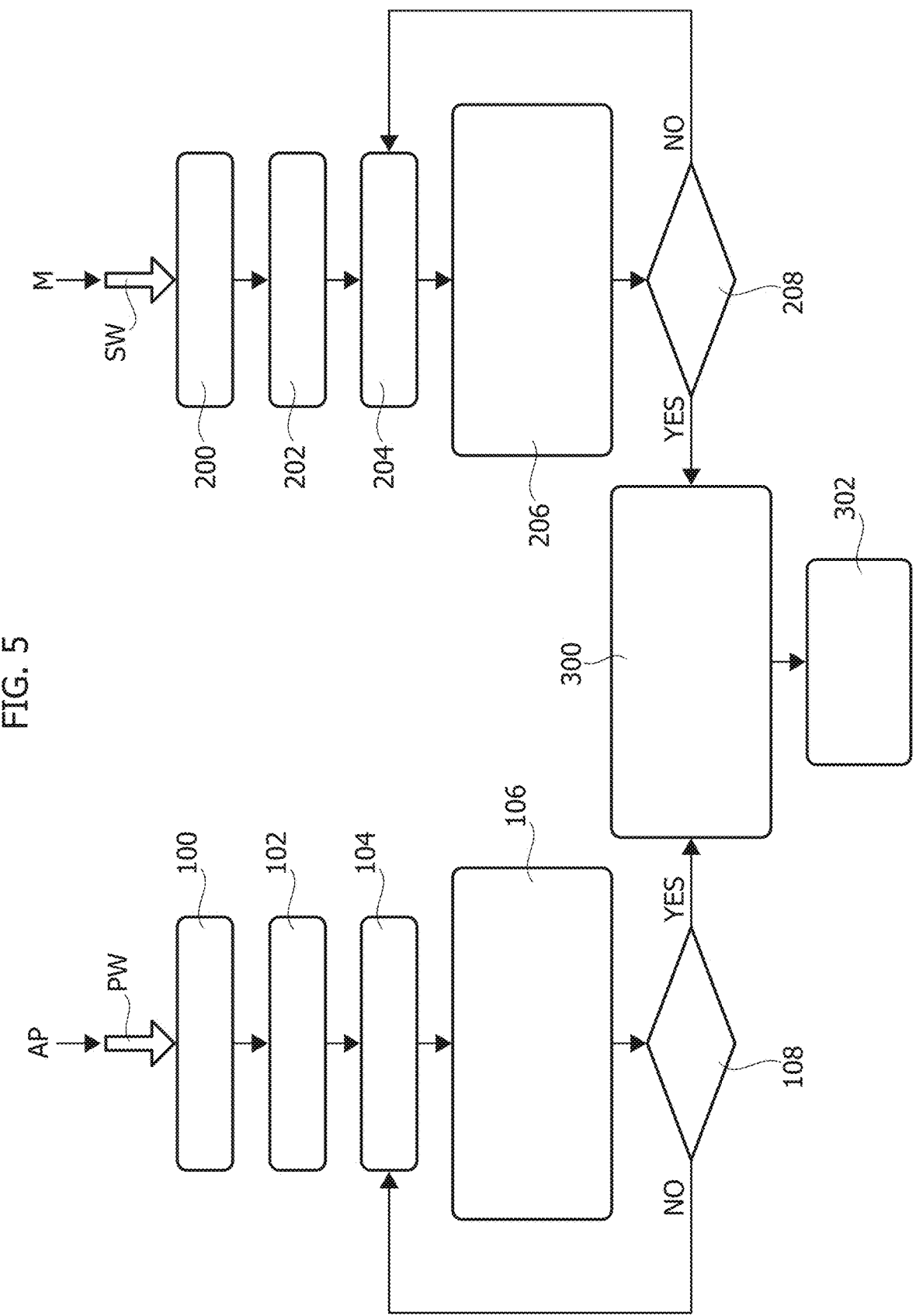
FIG. 5 is a flow chart exemplary of possible operation of embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

As noted, one or more embodiments aim at providing a system for detecting "door events" (e.g., a door being opened or closed) in a building suited for use also in buildings not equipped with Heating, Ventilating and Air Conditioning (briefly HVAC) installations.

Detecting so-called "door events" (e.g. opening or closing a door) is the subject-matter of extensive literature as witnessed, e.g., by patent documents such as: US 2014/0015640, U.S. Pat. Nos. 4,804,945, 9,410,346, CN 201460424 U, CN 203084798 U, and WO 2006/112258 A1.

It will be otherwise appreciated that while "door" events are referred to herein for simplicity and brevity, one or more embodiments may be applied more generally to building openings such as doors, windows, shutters and the like permitting communication between spaces (e.g., between indoor spaces in a building and/or between indoor and outdoor spaces). Similarly, while the sound produced by a handle being operated will be referred to herein for simplicity and brevity, one or more embodiments may involve detecting/recognizing other sounds related to opening/closing a door, window, shutter, etc. such as sounds produced by locks, leafs hitting on frame and the like.

As exemplified in FIG. 1, one or more embodiments may comprise:

an audio signal generator (e.g. a microphone) M to generate sound signals, a pressure signal generator (e.g. a barometer) AP to generate pressure signals, a processing circuit 10, which may include a sound circuit module 10M, an air pressure circuit module 10AP and a decision circuit module 10A configured (as discussed in the following) to process sound signals from the audio signal generator M and pressure signals from the pressure signal generator AP, and produce therefrom an alert signal (indicative e.g. of a door event corresponding to an intrusion), and an alert module A to communicate the alert signal (e.g. to a user, in order to make him or her aware of the door event detected).

One or more embodiments are suited to detect an opening/closing event of a building opening (indoor and/or outdoor) such as, e.g., a door D, assumed to be provided with a handle H.

For the sake of simplicity it will be assumed that such an event may give rise:

to a pressure signal such as a pressure wave, e.g. due to the movement of the door leaf and/or two environments on opposite sides of the opening at (slightly) different pressures being either put in communication or isolated from each other, to a sound signal such as a sound wave, e.g. due to the actuation of the handle H (and a lock associated therewith) and/or to the door leaf coming into abutment with the door frame.

As noted, both the microphone M and the barometer AP may be (already) included in a mobile device such as a smart phone (indicated UE in FIG. 1), the same possibly applying also to the alert module A (e.g., as a phone ringtone generator, vibration generator, phone display screen) and the processing circuit 10 (here shown as a distinct element for the sake of ease of illustration).

One or more embodiments may thus provide a "robust" door event detection system by taking advantage of the information from a sound recognition system (e.g. the microphone M).

In one or more embodiments, by combining air pressure data PW from a pressure sensor, e.g., AP, with the acoustic wave signals SW detected by (at least one) microphone, e.g. M, the circuit 10 is able to detect door events also in those conditions where procedures based (only) on pressure data may fail.

For instance, in one or more embodiments, a decision recognizing an opening/closing door event having taken place can exploit the co-existence of two events, namely a door handle sound "fingerprint" and an air pressure change.

Opening and closing door events produce a (sharp) pressure change with a certain pattern.

Pressure sensors in a smart phone are able to detect pressure changes related to door events. The amplitude of pressure peaks are (directly) proportional to the intensity of the force applied to the door.

The ability to detect door events decreases as a result of an increase of the space (volume) around the door and/or as a result of a reduction in the force applied to the door.

In one or more embodiments the processing circuit 10 may be configured (e.g. via an air pressure circuit module 10AP) to perform pressure peak detection and/or pressure pattern recognition on the pressure signal provided by the pressure sensor AP.

The pressure sensor available under the trade designation LPS22HB with companies of the group of companies of the Assignee is exemplary of a pressure sensor suited for use in connection with one or more embodiments.

The LPS22HB pressure sensor is an ultra-compact piezo-resistive absolute pressure sensor suited to operate as a barometer with a digital output.

The diagram of FIG. 2 is exemplary of a possible behavior of pressure (hPa, ordinate scale; 1 hectopascal [hPa]=0.001 bar) over time (abscissa scale), the presence of a door opening/closing event comprising:

an opening movement of the door O1,
an opened condition of the door O2,
a closing movement of the door C1,
a closed condition of the door C2.

The opening resp. closing movement corresponding to an increase resp. decrease of pressure may correspond, e.g., to a door being opened towards (or into) a room where the pressure signal is detected. It will be otherwise appreciated that the direction (sign) of the pressure change may be in the opposite direction, that is with an opening resp. closing movement corresponding to a decrease resp. increase of pressure.

As exemplified in the flow chart of FIG. 5 (left hand side), in one or more embodiments a corresponding pressure signal PW, as collected by the pressure sensor—see, e.g., the diagrams of FIGS. 3A and 3B—may be processed in an act exemplified by block 100 in the circuit module 10AP by applying a sliding time window approach in order to facilitate accurate detection of a pressure change pattern related to door opening/closing events.

For instance, in one or more embodiments the size of the sliding window can be chosen to accommodate a complete door event.

In one or more embodiments, the pressure signal PW can be sampled at e.g. 20 Hz.

In one or more embodiments, the pressure signal PW can be segmented in subsequent blocks (e.g., 3 s blocks) and/or stored in e.g. N size vectors.

For instance, a normalized sequence, where energy pulses are emphasized, can be produced by processing as exemplified by block 102 in FIG. 5.

For instance, for each vector, the signal energy can be estimated and the energy sequence thus obtained may be median-filtered, with the output of the median filter subtracted from the energy signal to produce a normalized energy signal.

Portions a) and b) of FIG. 3 are exemplary of a possible time behavior over time (abscissa scale) of such a normalized pressure signal (hPa, ordinate scale) in the case of opening (portion a) and closing (portion b) movements of a same door.

Thresholding may then be applied so that pressure peaks are detected when a threshold is exceeded, as exemplified by block 104 in FIG. 5.

For instance, thresholding may be of an adaptive type e.g. as a function of the standard deviation of a past long-term windowed energy sequence.

If an impulsive variation is detected, a recognition procedure may be triggered.

A first act in the recognition procedure comprises an analysis of the signal to be classified as exemplified by block 106 in FIG. 5.

Starting from pressure vector recordings, certain features can be extracted with reference to a certain "energy frame".

In one or more embodiments, the circuit block 104 may be configured to detect pulse-like variations in the pressure while the circuit block 106 may process, e.g. N vectors by extracting therefrom certain parameters useful for recognition purposes. One of these can be an energy value associated to a certain vector defined as the square root of the sum of the squared values.

Exemplary features extracted may comprise: rise-time, fall-time, and harmonic to average power ratio (based on DFT signal analysis).

A second act in the recognition procedure comprises a classification of the pressure vectors, as exemplified by block 108 in FIG. 5.

A statistical classifier function may predict (e.g., as a function of the features discussed previously) the likelihood that a vector may correspond to a door event having a certain pressure "fingerprint" (output of the statistical classifier function close to 1), or to a different pressure event, unlikely to represent a door event (output of the statistical classifier function close to 0).

A decision can be made by comparing the output of such statistical classifier function with a threshold value, in order to obtain a (final) binary classification $y_P \in \{0, 1\}$, where 1 denotes an event likely to be a door event detected by means of the pressure data collected by the pressure sensor AP, and 0 denotes other types of pressure events.

It will be appreciated that, throughout this description, referring to "1" and "0" values, respectively, is merely by way of example: one or more embodiments may in fact adopt a complementary choice (e.g. "0" and "1" values, respectively), or any other suitable Boolean encoding of such information.

In one or more embodiments, the processing circuit 10 may be configured (e.g., via a sound circuit module 10M) to perform detection (and possible localization) of impulsive sound(s) and/or sound pattern recognition on the acoustic wave signal SW provided by (at least one) microphone M.

The stereo digital microphone available under the trade designation MP34DT01-M with companies of the group of companies of the Assignee is exemplary of a microphone suited for use in connection with one or more embodiments.

The MP34DT01-M microphone is a MEMS audio sensor suited to operate as an omnidirectional digital microphone.

The diagrams of FIG. 4 are exemplary of a possible behavior over time (abscissa scale) of sound signals (dbFS, ordinate scale, e.g., normalized to an end-of-scale value) comprising multiple door handle events (D1, D2, D3).

Sound patterns captured by the microphone M in relation to e.g. door handle pushing and release may be used for the identification of the door opening/closing events.

As exemplified in the flow chart of FIG. 5 (right hand side), in one or more embodiments such sound wave signal (s) SW, as collected in an act exemplified by block 200, may be processed in the circuit module 10M in order to facilitate the detection of a sound wave pattern related to door opening/closing events.

It will be otherwise appreciated that a sound wave (in air) is per se a pressure signal, namely a pressure wave.

The frequency ranges involved in one or more embodiments are however different.

For instance, the pressure signals (e.g. PW) as considered herein are relatively "slow" signals (as noted, in one or more embodiments, the pressure signal PW can be sampled at e.g. 20 Hz).

By way of contrast, the acoustic or sound signals (e.g. SW) considered herein are in a frequency range corresponding to the audible range (notionally 20 Hz to 20 kHz). For instance, in one or more embodiments the acoustic signal(s) SW can be sampled at around 44 kHz (the sampling frequency contemplated for standard "Redbook" CDs).

In one or more embodiments, certain processing as discussed previously in connection with the pressure signal from the barometer AP can be similarly applied to the acoustic signal from the microphone M.

For instance, in one or more embodiments, the sound signal can be segmented in subsequent frames y (e.g., 3 s frames) and/or stored in e.g. N size vectors as exemplified by block 202 in FIG. 5.

In the case of a sound signal, a detection issue may be related to distinguishing conditions where a signal embedded in noise is present from conditions where only noise is present.

As exemplified by block 204 in FIG. 5, a possible method of signal detection may involve energy detection, by measuring the energy in the received waveform(s) over a certain observation time, with source localization (direction) possibly taking place in one or more embodiments, e.g., by taking advantage of the availability of a stereo sound signal so that the direction from which the sound comes can be assessed based on the relative delays between the two "channels" in the stereo sound signal.

One or more embodiments may adopt energy detection as a possible solution based on the (sensible) assumption that both noise w and the "useful" signal s can be considered zero-mean Gaussian random vectors with uncorrelated components.

One or more embodiments may thus involve sensing sound pulses occurring in sound signals affected by noise (e.g., ambient noise), wherein a sound pulse occurring in the sound signals is sensed as a result of a signal-to-noise threshold being reached.

In one or more embodiments such a threshold may include a threshold expressed as a ratio of a signal (plus noise) energy to noise energy.

In one or more embodiments, a corresponding energy detection act may involve computing the ratio between the square of the Euclidean norm of the observation vector y (representative of noise plus, possibly, sound) and the variance $\sigma_w^2$ of the noise signal (alone) and comparing such ratio to a threshold value th. If the ratio exceeds the threshold value (hypothesis H1 below), the observation vector y expectedly carries a sound signal s, therefore y=s+w.

If the ratio does not exceed the threshold value (hypothesis H0 below), the observation vector y expectedly carries noise only, therefore y=w.

In mathematical terms:

$$\frac{y^T y}{\sigma_w^2} > th : H1 \rightarrow y = s + w$$

$$\frac{y^T y}{\sigma_w^2} < th : H0 \rightarrow y = w$$

where $y^T y$ is the inner product of the observation vector y and its transposed version $y^T$.

As noted, in one or more embodiments, the procedure may use sound source localization, e.g., by using a couple of microphones or a stereo microphone (e.g. MP34DT01-M), in order to make more robust the detection of door events.

Smart phones as commercially available today may come with two built-in microphones located at (physically) different positions, e.g., a "stereo" microphone. This difference in position can cause time difference of arrival (TDOA) of sound on the microphones. Values of TDOA for two microphones may vary depending on the location of a sound source with respect to a smart phone. This time difference of arrival may be used to estimate the direction of an incoming sound with respect to a smart phone. The time delay estimation may be achieved by correlating the sound signals of two microphones in a microphone pair. Corresponding techniques for obtaining such a result are known in the art, which makes it unnecessary to provide a more detailed description herein.

In one or more embodiments, if an impulsive sound is detected and the sound source localization is found to match with a known location of a door, a corresponding recognition procedure may be triggered.

One or more embodiments, as exemplified in the right-hand portion of FIG. 5, may comprise an analysis of the signal to be classified as exemplified by block 206.

For instance, starting from sound vector audio recordings, certain features can be extracted with reference to a certain energy frame (with the energy associated to a vector again defined, e.g., as the square root of the sum of squared values).

Exemplary features extracted may comprise: rise-time, fall-time, and harmonic to average power ratio (based on DFT signal analysis).

A further act in the procedure may comprise a classification of the sound vectors, as exemplified by block 208 in FIG. 5.

A statistical classifier function may predict (e.g. as a function of the features discussed previously) the likelihood that a vector may correspond to a door event having a certain sound "fingerprint" (output of the statistical classifier function close to 1), or to a different sound event, unlikely to represent a door event (output of the statistical classifier function close to 0).

A decision can be made by comparing the output of such statistical classifier function with a threshold value, in order to obtain a (final) binary classification $y_s \in \{0, 1\}$, where 1 denotes an event likely to be a door event detected by means of the sound wave data collected by the at least one microphone M, and 0 denotes other types of sound events.

It will be again appreciated that referring to "1" and "0" values, respectively, is merely by way of example: one or more embodiments may in fact adopt a complementary choice (e.g. "0" and "1" values, respectively), or any other suitable Boolean encoding of such information.

In one or more embodiments, the processing circuit 10 may be configured (e.g. via a decision circuit module 10A) to produce an alert signal based on the outputs of circuit modules 10AP and 10M, and take decisions as to the detection of door events.

A decision act as exemplified by block 300 in FIG. 5 may be based essentially on the following possible conditions: no door event detected by either of circuit modules 10AP (pressure pattern) and 10M (sound pattern); a door event detected by module 10AP with no door event detected by circuit module 10M, a door event detected by module 10M with no door event detected by circuit module 10AP, door event detected by both circuit modules 10AP and 10M.

In one or more embodiments, the block 300 may adopt a simple decision strategy by "declaring" a door event, with a corresponding alert signal (e.g. phone ringtone) issued at 302 (see also circuit module A in FIG. 1) when a door event is detected by both circuit modules 10AP (pressure pattern) and 10M (sound pattern).

In one or more embodiments the block 300 may adopt more sophisticated decision strategies making the procedure more robust e.g. against "false positives" (non-existing door events undesirably detected).

In one or more embodiments, such strategies may involve an analysis of the sequence over time of the pressure and sound detection, e.g. in order to distinguish in a more robust manner opening and closing events.

For instance (just to make a simple example), in an opening event, the handle sound will at least slightly "lead" the pressure signal while in a closing event, the handle sound will at least slightly "lag" the pressure signal.

In one or more embodiments, such strategies may include e.g. "fuzzy logic" decisions based on the outputs of the circuit modules 10AP and 10M.

In one or more embodiments a method may comprise:

collecting (e.g. 100, 200), at a building opening (such as e.g. a door, a window, a shutter and the like, D), air pressure signals (as produced e.g. by movement of a door or window leaf, PW) from a pressure sensor (e.g. AP) and sound signals (as produced e.g. by a handle, lock, leaf hitting the opening frame, SW) from a sound sensor (e.g. M), sensing pressure peaks (e.g. 102 to 108) occurring in the air pressure signals, sensing sound pulses (e.g. 202 to 208) occurring in the sound signals, detecting (e.g. 300) the joint occurrence (not necessarily simultaneous) of a pressure peak in the air pressure signals and a sound pulse in the sound signals, the joint occurrence being indicative of an opening/closing event of the building opening (D), e.g. as produced by an undesired intrusion.

In one or more embodiments, sensing pressure peaks occurring in the air pressure signals may comprise applying pressure pattern recognition processing to the air pressure signals, and/or processing the air pressure signals over a sliding time window.

In one or more embodiments, sensing pressure peaks occurring in the air pressure signals may comprise normalizing the air pressure signals and comparing the normalized pressure signals to a pressure threshold, wherein a pressure peak occurring in the air pressure signals is sensed as a result of the pressure threshold being reached.

One or more embodiments may comprise adaptively varying the pressure threshold.

In one or more embodiments, sensing sound pulses occurring in the sound signals may comprise applying sound pattern recognition to the sound signals, and/or processing the sound signals over a sliding time window.

In one or more embodiments, sensing sound pulses occurring in the sound signals may include sensing sound pulses occurring in sound signals (e.g., SW) affected by noise, wherein a sound pulse occurring in the sound signals is sensed as a result of a signal-to-noise threshold being reached (e.g., with the threshold value th discussed in the foregoing being exemplary of such a threshold).

One or more embodiments may comprise collecting stereo sound signals (see e.g. FIG. 4) from a stereo sound sensor and applying time-difference-of-arrival, TDOA, sound source localization processing to the stereo sound signals collected.

In one or more embodiments, detecting the joint occurrence of a pressure peak in the air pressure signals and a sound pulse in the sound signals may comprise applying statistical classifier analysis (e.g. 108, 208) of the pressure peaks sensed in the air pressure signals and the sound pulses sensed in the sound signals.

One or more embodiments may comprise applying the statistical classifier analysis of the pressure peaks and the sound pulses as a function of features selected out of rise-time, fall-time and harmonic-to-average power ratio.

One or more embodiments may comprise issuing (e.g. 10A, 302) an alert signal as a result of the joint occurrence of a pressure peak in the air pressure signals and a sound pulse in the sound signals detected.

In one or more embodiments, a circuit (e.g. 10) may comprise:

an air pressure circuit module (e.g. 10AP) sensitive to air pressure signals (e.g. PW) from a pressure sensor (e.g. AP), the air pressure circuit module configured to sense pressure peaks occurring in the air pressure signals, a sound circuit module (e.g. 10M) sensitive to sound signals (e.g. SW) from a sound sensor (e.g. M), the sound circuit module configured to sense sound pulses occurring in the sound signals, a detection circuit module (e.g. 10A) coupled to the air pressure circuit module and to the sound circuit module, the detection circuit module configured to detect the joint occurrence of a pressure peak in the air pressure signals sensed by the air pressure circuit module and of a sound pulse in the sound signals sensed by the sound circuit module, wherein the circuit is configured to detect opening/closing events in building openings (e.g. D) with the method of one or more embodiments.

In one or more embodiments, a device (e.g. UE) may comprise:

a circuit according to one or more embodiments, a pressure sensor coupled to the circuit to provide air pressure signals to the air pressure circuit module in the circuit, a sound sensor coupled to the circuit to provide sound signals to the sound circuit module in the circuit.

One or more embodiments may comprise an alert signal source (e.g. A) coupled to the detection circuit module in the circuit, the alert signal source activatable as a result of detection of the joint occurrence of a pressure peak in the air pressure signals sensed by the air pressure circuit module and of a sound pulse in the sound signals sensed by the sound circuit module.

A device according to one or more embodiments may comprise a mobile communication equipment (e.g., a smart phone equipped with a barometer and a microphone).

One or more embodiments may comprise a computer program product, loadable (e.g., as a so-called "app") in the memory of at least one processing circuit (see e.g. the circuit 10) and including software code portions for performing the method of one or more embodiments.

Without prejudice to the underlying principles, the details and embodiments may vary, even significantly, with respect to what has been described by way of example only, without departing from the extent of protection.

The extent of protection is defined by the annexed claims.

What is claimed is:

1. A method, comprising:
    collecting air pressure signals using a pressure sensor, the air pressure signals indicative of a change in pressure between an interior and an exterior of a building;
    collecting sound signals using a sound sensor, the sound signals indicative of an audible event occurring in an area in a vicinity of a building opening;
    sensing pressure peaks occurring in the air pressure signals;
    sensing sound pulses occurring in the sound signals; and
    detecting a joint occurrence of a pressure peak in the air pressure signals and a sound pulse in the sound signals, the joint occurrence being indicative of an opening/closing event of the building opening.

2. The method of claim 1, wherein sensing pressure peaks occurring in the air pressure signals comprises:
    applying pressure pattern recognition processing to the air pressure signals; and/or
    processing the air pressure signals over a sliding time window.

3. The method of claim 2, wherein sensing the pressure peaks occurring in the air pressure signals comprises normalizing the air pressure signals and comparing the normalized pressure signals to a pressure threshold, wherein a pressure peak occurring in the air pressure signals is sensed as a result of the pressure threshold being reached.

4. The method of claim 3, wherein the pressure threshold is an adaptively varying pressure threshold.

5. The method of claim 1, wherein sensing sound pulses occurring in the sound signals comprises:
   applying sound pattern recognition to the sound signals; and/or
   processing the sound signals over a sliding time window.

6. The method of claim 5, wherein sensing the sound signals comprises sensing sound pulses occurring in sound signals affected by noise, wherein a sound pulse occurring in the sound signals is sensed as a result of a signal-to-noise threshold being reached.

7. The method of claim 1, wherein the method comprises collecting stereo sound signals from a stereo sound sensor and applying time-difference-of-arrival sound source localization processing to the stereo sound signals collected.

8. The method of claim 1, wherein detecting the joint occurrence of a pressure peak in the air pressure signals and of a sound pulse in the sound signals comprises applying statistical classifier analysis of the pressure peaks sensed in the air pressure signals and to the sound pulses sensed in the sound signals.

9. The method of claim 8, comprising applying the statistical classifier analysis of the pressure peaks and the sound pulses as a function of features selected out of rise-time, fall-time and harmonic-to-average power ratio.

10. The method of claim 1, further comprising issuing an alert signal as a result of the joint occurrence of a pressure peak in the air pressure signals and of a sound pulse in the sound signals detected.

11. A circuit, comprising:
   an air pressure circuit sensitive to air pressure signals from a pressure sensor, the air pressure circuit configured to sense pressure peaks occurring in the air pressure signals, the air pressure signals indicative of a change in pressure between an interior and an exterior of a building;
   a sound circuit sensitive to sound signals from a sound sensor, the sound circuit configured to sense sound pulses occurring in the sound signals; and
   a processor coupled to the air pressure circuit and to the sound circuit, the processor configured to detect a joint occurrence of a pressure peak in the air pressure signals sensed by the air pressure circuit and of a sound pulse in the sound signals sensed by the sound circuit.

12. The circuit of claim 11, wherein air pressure circuit is configured to sense pressure peaks occurring in the air pressure signals by applying pressure pattern recognition processing to the air pressure signals, or processing the air pressure signals over a sliding time window.

13. The circuit of claim 11, wherein the sound circuit is configured to sense sound pulses occurring in the sound signals by applying sound pattern recognition to the sound signals, or processing the sound signals over a sliding time window.

14. The circuit of claim 11, wherein the processor is configured to detect the joint occurrence by applying statistical classifier analysis of the pressure peaks sensed in the air pressure signals and to the sound pulses sensed in the sound signals.

15. The circuit of claim 14, wherein the processor is configured to apply the statistical classifier analysis of the pressure peaks and the sound pulses as a function of features selected out of rise-time, fall-time and harmonic-to-average power ratio.

16. The circuit of claim 11, wherein the processor is configured to issue an alert signal as a result of the joint occurrence of a pressure peak in the air pressure signals and of a sound pulse in the sound signals detected.

17. A device comprising:
   a pressure sensor;
   a sound sensor;
   an air pressure circuit coupled to receive air pressure signals from the pressure sensor, the air pressure circuit configured to sense pressure peaks occurring in the air pressure signals, the air pressure signals indicative of a change in pressure between an interior and an exterior of a building;
   a sound circuit coupled to receive sound signals from the sound sensor, the sound circuit configured to sense sound pulses occurring in the sound signals; and
   a processor coupled to the air pressure circuit and to the sound circuit, the processor configured to detect a joint occurrence of a pressure peak in the air pressure signals sensed by the air pressure circuit and of a sound pulse in the sound signals sensed by the sound circuit.

18. The device of claim 17, further comprising an alert signal source coupled to processor, the alert signal source activatable as a result of detection of the joint occurrence of a pressure peak in the air pressure signals sensed by the air pressure circuit and of a sound pulse in the sound signals sensed by the sound circuit.

19. The device of claim 17, wherein the device comprises a mobile communication equipment.

20. The device of claim 17, wherein the air pressure circuit is configured to:
   apply pressure pattern recognition processing to the air pressure signals; or
   process the air pressure signals over a sliding time window.

* * * * *